United States Patent

Berglund et al.

[19]

[11] Patent Number: 6,055,581

[45] Date of Patent: Apr. 25, 2000

[54] VITAL PRODUCT DATA CONCENTRATOR AND PROTOCOL CONVERTER

[75] Inventors: Neil Clair Berglund, Kasson; Todd Jon Rosedahl, Zumbrota, both of Minn.

[73] Assignee: International Business Machines Corporation, Armonk, N.Y.

[21] Appl. No.: 08/912,403

[22] Filed: Aug. 18, 1997

[51] Int. Cl.[7] ................................................. G06F 15/02

[52] U.S. Cl. ............................................................. 710/11

[58] Field of Search ......................... 395/500; 370/466, 370/474, 395, 402, 347, 419, 438; 710/10, 11, 51, 105, 5

[56] References Cited

U.S. PATENT DOCUMENTS

| | | | |
|---|---|---|---|
| 4,509,113 | 4/1985 | Heath | 710/66 |
| 4,807,282 | 2/1989 | Kazan et al. | 379/284 |
| 5,794,014 | 8/1998 | Shetty et al. | 395/500.46 |
| 5,832,244 | 11/1998 | Jolley et al. | 710/129 |
| 5,887,187 | 3/1999 | Rostoker et al. | 712/29 |

*Primary Examiner*—Moustafa M. Meky
*Attorney, Agent, or Firm*—Christopher H. Lynt

[57] ABSTRACT

A concentrator and protocol converter for concentrating signals from a plurality of information circuits and coupling to a computer system control device, and for converting between at least two communications protocols. The information circuits contain vital product data (VPD) about associated devices which is used by the computer system control device.

20 Claims, 10 Drawing Sheets

VITAL PRODUCT DATA CONCENTRATOR AND PROTOCOL CONVERTER

CROSS REFERENCE TO RELATED PATENT AND PATENT APPLICATIONS

The subject matter of this application is related to U. S. Pat. No. 5,117,430, which issued May 26, 1992, is assigned to the same assignee as the present application, and is hereby incorporated by reference in its entirety. This application is also related to application Ser. No. 08/912,402, filed Aug. 18, 1997, entitled "POWER CONFIGURATION" by NEIL C. BERGLUND, now U.S. Pat. No. 5,935,252, which is hereby incorporated by reference in its entirety; and to application Ser. No. 08/912,561, filed Aug. 18, 1997, entitled "FAIL-SAFE COMMUNICATIONS NETWORK FOR USE IN SYSTEM POWER CONTROL" by NEIL C. BERGLUND, still pending, which is hereby incorporated by reference in its entirety.

BACKGROUND OF THE INVENTION

1. Field of the Invention

The invention relates to the field of computer system communications, and in particular, to a concentrator and protocol converter for concentrating signals from a number of sources in a computer system into one serial interface, and for converting communication protocols to enable communication between devices with differing protocol specifications.

2. Background Information

Many computer systems are designed and built to have a number of different possible configurations, for example the IBM AS/400 system (IBM and AS/400 are registered trademarks of International Business Machines Corporation). The configurations may vary in number of processors, amount of memory, number of I/O devices, and in the required amounts of power, cooling and/or power sequencing. It may be necessary to detect that certain components are present and correctly configured for the particular processor type used in the system. In the past, such configuration information was determined from configuration pins on backplanes or processor cards, for example. However this method is limited by the number of available pins and the effort required to change the configuration ID. It may require that expensive components be changed to force a change in the configuration ID when there was no other reason to change the component.

The various processing elements of the computer system, including racks and/or towers, may be interconnected by a control network, e.g., the system power control network (SPCN). The SPCN was designed as a low volume serial network used to monitor power conditions at a plurality of nodes in a computer system of racks/towers, in particular, the IBM AS/400. The nodes typically include microprocessors which monitor the status of, and make occasional adjustments to, the power conditions at the respective nodes. A tower is a small rack typically containing a tower node processor and only one slave processor, while a rack typically contains a rack node processor and several slave processors. A primary rack or tower of the network also contains a central electronics complex (CEC) with the network "master" processor, as well as the computer system CPU. Such a network is the subject matter of the inventor's prior U.S. Pat. No. 5,117,430, and an improved network is the subject matter of the inventor's co-pending related application, referenced above.

The solution to the above problems associated with using configuration pins, which is the subject matter of the related co-pending application referenced above, is to add information circuits, in particular, VPD (Vital Product Data) chips, to the computer system (e.g., an IBM AS/400) processors, backplanes, and memory cards, to store various configuration and asset information (vital product data), such as power and cooling requirements, and provide this information to the computer system. It may also be desirable, for example, to add these VPD chips to other cards in the Central Electronics Complex (CEC—the site of the host CPU), and to expansion towers of the computer system.

One particular type of VPD chip is referred to herein as the "smart card" VPD chip. This chip provides secure, i.e., encrypted, data storage, and communicates with outside devices using a half-duplex asynchronous block protocol, such as described in ISO 7816-3. However, this communications standard provides limited addressability, and for electrical loading and performance reasons, a large number of VPD chips cannot be connected to a common, i.e., multi-dropped, interface. Further, since failures on a multi-dropped interface could preclude communication with all chips, and since communication with a subset of the VPD chips is required to successfully operate the computer system, a more robust design uses point-to-point interfaces. However, using point-to-point interfaces in turn creates the need to concentrate a large number of point-to-point interfaces to a common point for communication with the computer system.

The smart card VPD chip protocol uses unique error detection and recovery at the protocol layer that is best hidden from the application layers of the computer system, which are only interested in the data which is stored in the chips.

Therefore, a need existed for a way of concentrating the signals from the Smart card VPD chips to a computer system control point, and further a way of handling the special protocol requirements of the smart card VPD chips within the existing computer system's network protocol, e.g., SPCN (System Power Control Network) protocol.

SUMMARY OF THE INVENTION

It is, therefore, a principle object of this invention to provide a vital product data concentrator and protocol converter.

It is another object of the invention to provide a vital product data concentrator and protocol converter that solves the above mentioned problems.

These and other objects of the present invention are accomplished by the vital product data concentrator and protocol converter disclosed herein.

According to one aspect of the invention, the concentrator and protocol converter provides a way of interfacing a multitude of VPD chips' signals to one control point, while handling the special protocol requirements of the VPD chips.

According to another aspect of the invention, a concentrator and protocol converter is provided which concentrates, for example, up to 256 smart card VPD chip interfaces to a single system serial interface. By definition, a concentrator is a device that feeds the signals from several devices into a single transmission line for input to another device, e.g., a computer, and vice versa.

According to another aspect of the invention, the concentrator also encapsulates the special smart card Protocol within the SPCN network protocol. This provides a single system interface to smart card VPD located on the local concentrator, in the CEC, or on a remote concentrator in an expansion tower.

According to another aspect of the invention, multiple point-to-point interfaces with the VPD chips are provided, concentrated to one signal line, and routed to the computer system panel directly, or through SPCN.

According to another aspect of the invention, the concentrator handles the unique smart card protocol and maintains a unique sequence status for each port to the VPD chips so that software is able to initiate communication with the VPD chips in any order.

According to another aspect of the invention, the concentrator is connected to the computer system panel in the central electronics complex (CEC) so that the smart card VPD chip function is available in non-SPCN systems, in systems using integrated panel and SPCN functions, as well as in systems having an independent panel and an SPCN network interconnecting system racks/towers. Non-SPCN systems are those systems that are too small to require external expansion towers or the ability to control and monitor power, cooling, and backup power, for example. Integrated panel/SPCN systems are those systems requiring limited intelligent power monitoring, where that limited capability is incorporated into the functions of the computer system panel.

According to another aspect of the invention, the concentrator architecture uses SPCN panel interface architecture so that both SPCN and the concentrator present a single interface protocol to the panel.

According to another aspect of the invention, the concentrator architecture presents an SPCN network interface to the operating system so that existing interfaces to the operating system can be used to communicate with the VPD chips in the CEC, or in expansion towers.

According to another aspect of the invention, the concentrator handles the protocol layer of smart card protocol and shields physical communication, message sequence management, and error recovery from the panel, service processor, and the operating system.

According to another aspect of the invention, application layer communication is between the operating system and the VPD chips. Each frame of multi-frame commands at the application layer is handled as a separate transaction in the concentrator protocol, thereby keeping the concentrator inexpensive and simple enough to be implemented using read only storage (ROS) programming. The concentrator, panel, and service processor are not aware of those application layer transactions between the operating system and the VPD chips.

According to another aspect of the invention, the concentrator provides addressability to each connected VPD chip and maintains sequence status so that multi-frame commands may be initiated with one chip before a multi-frame command is completed with another.

According to another aspect of the invention, the smart card protocol is encapsulated within an SPCN network command, even though the concentrator is directly connected in the CEC. This shields all components in the path from the concentrator to the operating system from the details of the smart card protocol layer and presents a single SPCN command interface to the operating system for VPD chips which are located in the CEC, and ultimately for those located in expansion towers.

According to another aspect of the invention, the SPCN network command is in turn encapsulated in SPCN/panel interface protocol for communication between the panel and concentrator. This minimizes the impact on the panel to provide a part of the path from the operating system to the concentrator.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1A:
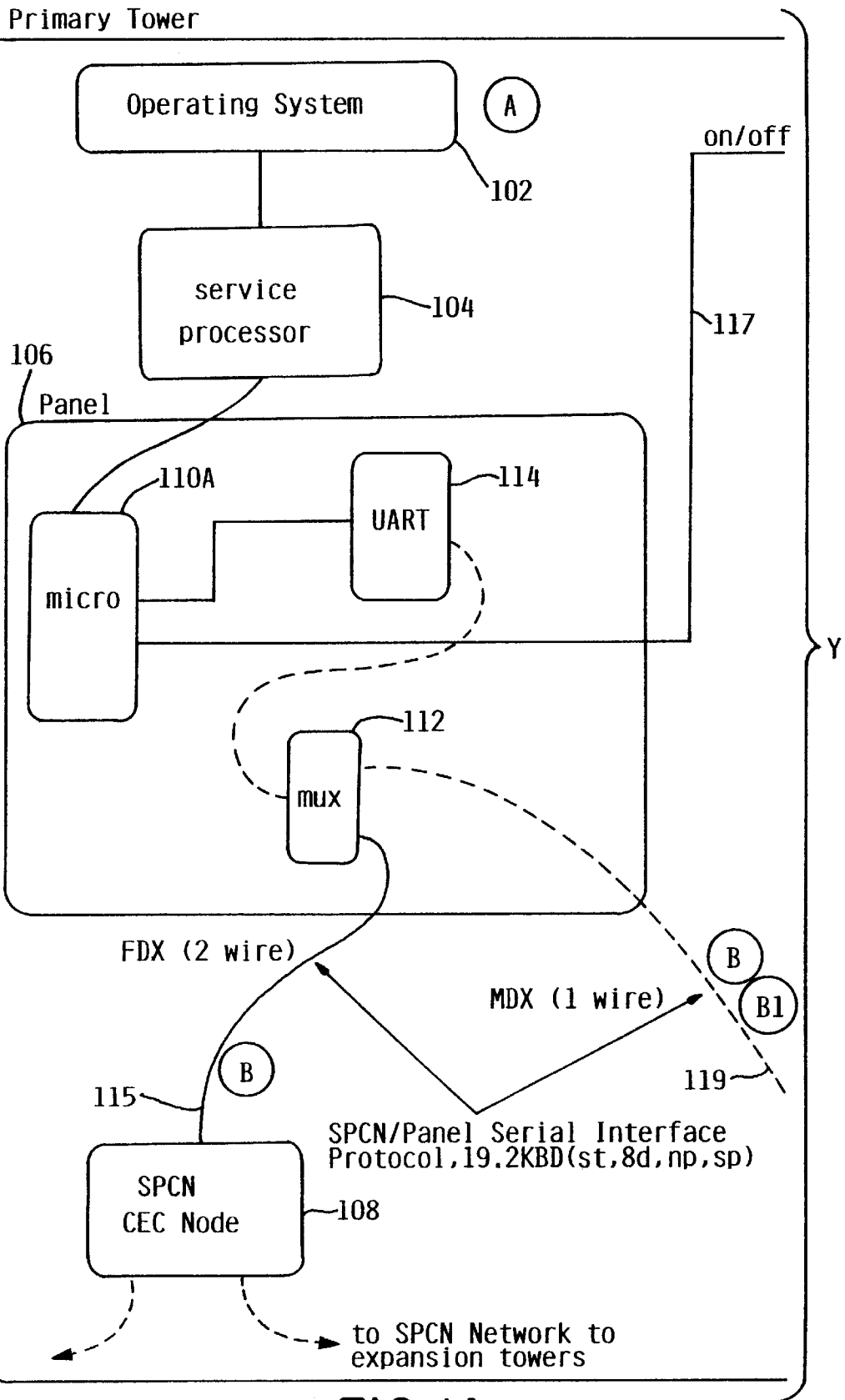
FIGS. 1A–C1 illustrates a VPD chip hardware interface in one model of an exemplary computer system (IBM AS/400) utilizing an embodiment of the present invention.
Figure 1B:
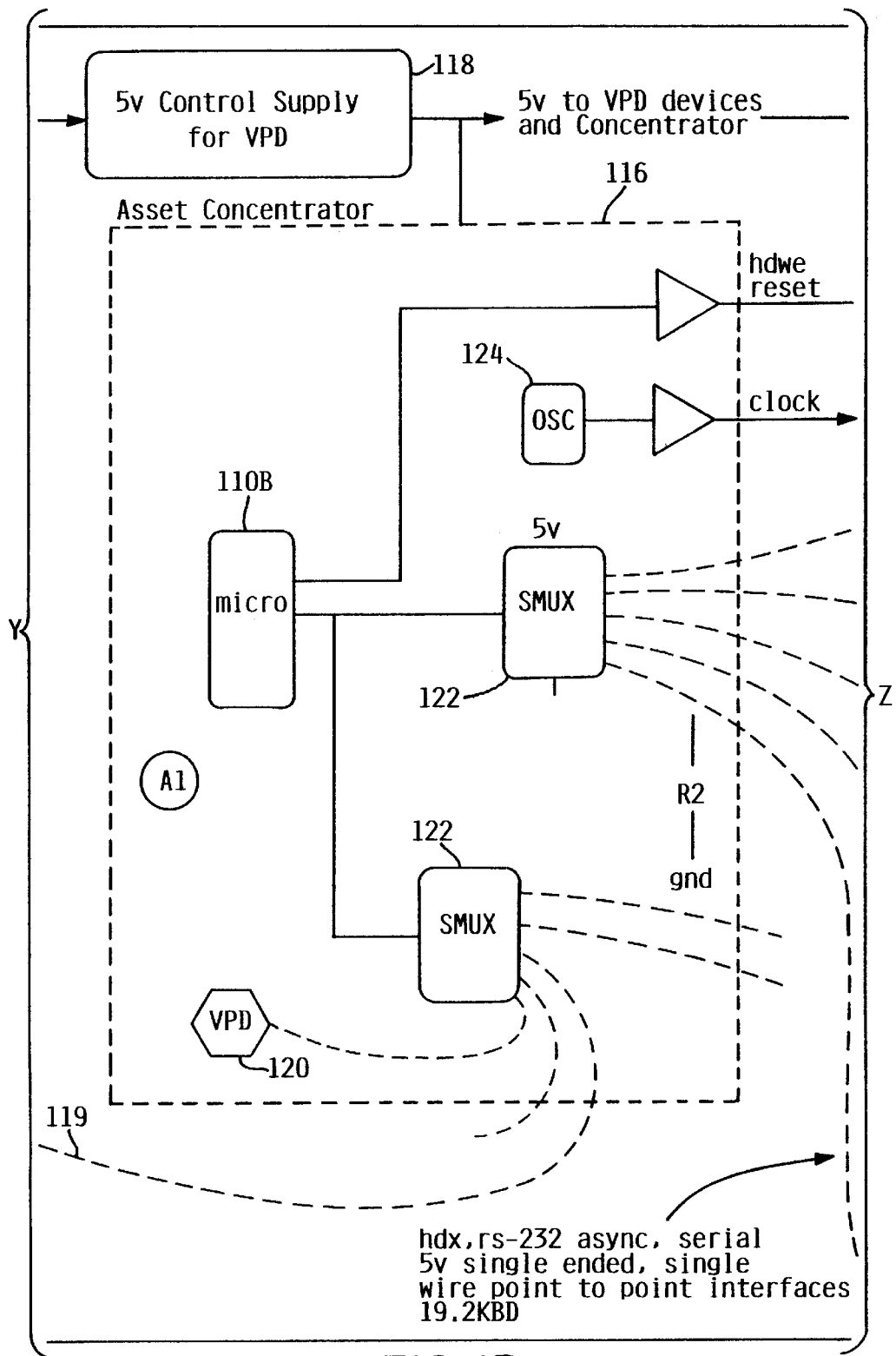
Figure 1C:
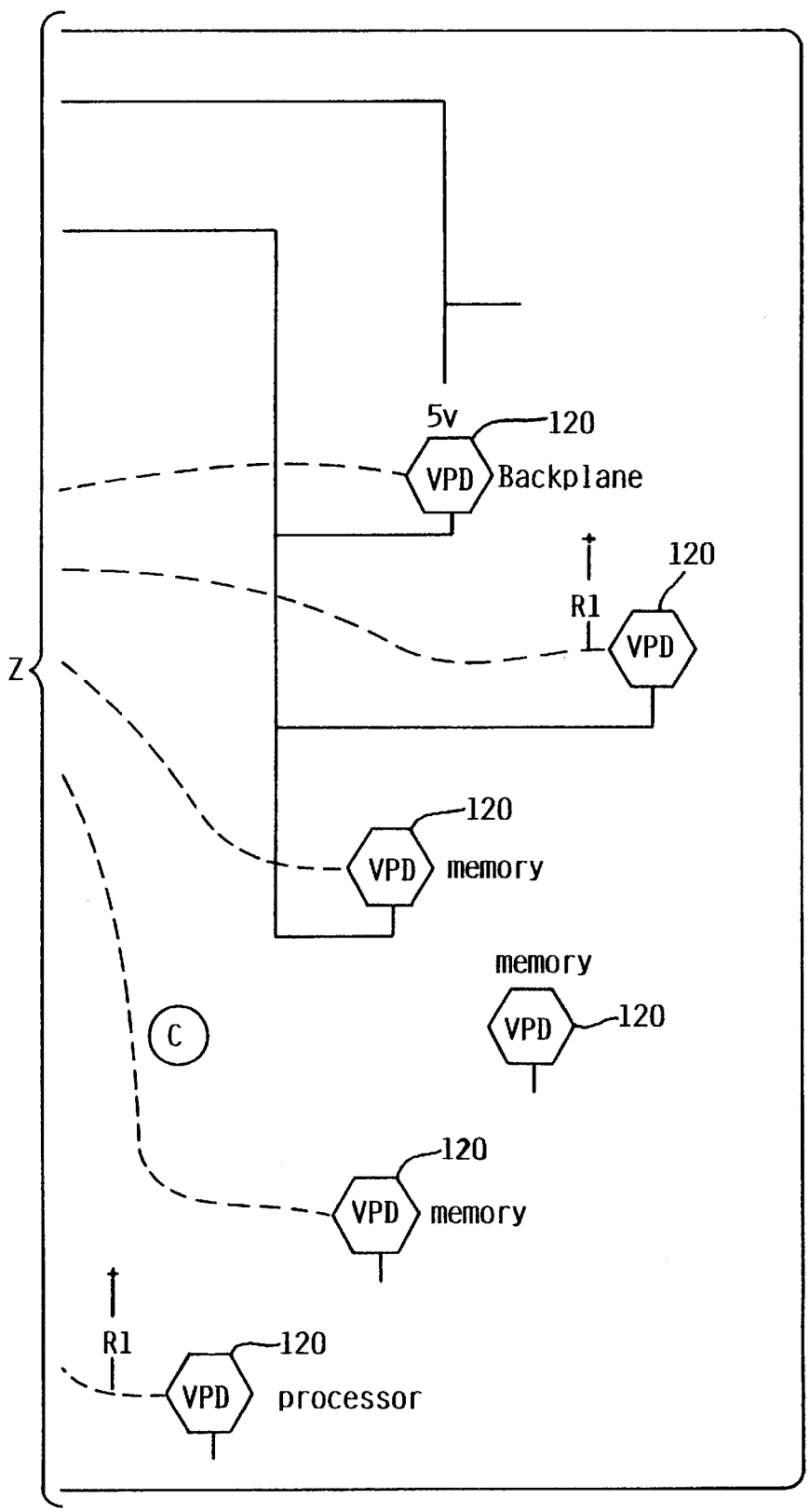

FIG. 1 illustrates an exemplary hardware interface in a computer system using an embodiment of the present invention. Operating system 102 communicates with service processor 104 through, for example, the system I/O interface, using messages and DMA buffers. The service processor 104 communicates with the panel 106 through, for example, a serial asynchronous interface. The operating system to service processor interface, and the service processor to panel interface, exist principally to provide system IPL (initial program load) and to support system service functions. An additional function of these interfaces is to pass SPCN commands through from the operating system to SPCN to provide the system interface to system power control, backup power control, and power and cooling fault reporting. However, the details of the protocols of the operating system-to-service processor-to-panel interfaces are not necessary for an understanding of the present invention and are therefore not described herein.

As mentioned at the outset, a concentrator may be connected to the panel in the central electronics complex (CEC) 108 so that the smart card VPD chip function is available in non-SPCN systems, in systems using integrated panel and SPCN functions, as well as in systems having an independent panel and an SPCN network interconnecting system racks/towers. As mentioned, non-SPCN systems are those systems too small to require external expansion towers or the ability to control and monitor power, cooling, and backup power, while integrated panel/SPCN systems are those systems requiring limited intelligent power monitoring where that limited capability is incorporated into the functions of the panel. Although in an exemplary embodiment, smart card VPD chips 120 are described, as can be appreciated, other types of information circuits could be used to store the vital product data.

A SPCN system with a local concentrator 116 is shown in FIG. 1. The panel 106 is connected to the SPCN CEC node 108, i.e., the primary node of an SPCN network, through microprocessor 110A, a universal asynchronous receiver/transmitter (UART) 114, multiplexer (MUX) 112, and the two wire interface 115. The CEC node 108 is connected to system expansion towers (not shown) through the SPCN network.

Local concentrator 116 is also connected to the panel 106 through MUX 112 and a one wire interface 119. In particular, panel microprocessor 110A is coupled to UART 114 and MUX 112 which thereby provide a panel interface port which can be used for both the SPCN network via the CEC node 108, and the local VPD concentrator 116. The panel 106 switches between these through MUX 112. This is possible since the concentrator 116 and the SPCN network appear as a single interface to the system. Multiplexing these interfaces advantageously permits a lower cost implementation of the panel 106 and service processor 104.

As mentioned at the outset, by virtue of the concentrator architecture using SPCN panel interface architecture, both SPCN and the concentrator present a single interface protocol to the panel 106. The concentrator architecture presents an SPCN network interface to the operating system 102, so that existing interfaces to the operating system 102 can be used to communicate with the VPD chips 120 in the CEC node 108, or in expansion towers.

The protocol between the panel 106 and SPCN CEC node 108 includes several commands for private communication between SPCN and the panel 106, i.e., the operating system 102 is not involved. These commands are principally for receiving the power on/off commands from the panel 106 and for displaying power/cooling faults on the panel 106, for example.

One command, referred as WBC (Write Block Control), is used to pass commands and responses between the operating system 102 and the SPCN network. SPCN commands and response from/to the operating system 102 are framed with WBC protocol to identify the contents as commands or responses directed from or to the operating system 102. The particulars of this will be described later.

The panel microprocessor 110A also controls a 5 volt supply 118 through control line 117. The 5 volt supply provides power for the VPD chips 120 and local concentrator 116. Through this control supply 118, the VPD chips 120 may be powered up and their data read prior to powering up the entire computer system, when such a procedure is appropriate, such as when system components could be damaged by powering up without first considering the vital product data. As already noted, vital product data may include power and cooling requirements of the associated device. Not meeting these requirements in the worst case could result in damage to the device in question, or in other cases merely result in non-optimum performance.

The panel 106 communicates with the local concentrator 116 over line 119 using SPCN/panel serial interface protocol, i.e., the concentrator 116 behaves as a CEC Node that only uses one command (WBC) of the SPCN/panel interface command repertoire. The local concentrator microprocessor 110B communicates with the panel 106 through one line of a multiplexer (SMUX) 122. The local concentrator 116 also communicates with VPD chips 120 through multiplexers 122. An oscillator 124 provides a clock signal to the VPD chips. The local concentrator microprocessor 110B may have other functions, however for the purposes of the present invention, it acts as the "controller" of the VPD chips 120 and the multiplexers 122.

As mentioned at the outset, according to one aspect of the invention, the concentrator 116 provides a way of interfacing a multitude of VPD chips 120 to one control point, while handling the special protocol requirements of the VPD chips 120. The concentrator 116 concentrates, for example, up to 256 smart card VPD chips 120 to a single system serial communication line 119. In this way, multiple point-to-point interfaces with the VPD chips 120 are provided, concentrated to one signal path (line 119), and routed to the computer system panel directly (or through SPCN).

The VPD chips 120 are associated with various devices, e.g., backplanes, memories, processors, and I/O devices, and they provide vital product data, e.g., power and/or cooling requirements, about their respective associated device. The local concentrator 116 communicates to receive the vital product data with each of the VPD chips 120 using a respective serial single wire point-to-point interface as in the illustrated embodiment.

In the illustrated embodiment, each VPD chip 120 is connected to a unique concentrator 116 serial multiplexer 122 port. These connections are each pulled up to Vcc by a resistor (R1) located at the respective VPD chip 120, and pulled down to ground by a resistor (R2) located at the concentrator 116 (only some resistors are shown to avoid clutter). These pull-up and pull-down resistors are sized to allow the concentrator 116 to detect the presence of a VPD chip 120 on each port by tri-stating the multiplexer 122 output, and reading the logic state on the interface signal. For example, if pull-up resistor R1 is 10 times pull-down resistor R2, a high level indicates the VPD chip 120 is present, and a low level indicates the VPD chip 120 is not present.

Figure 5:
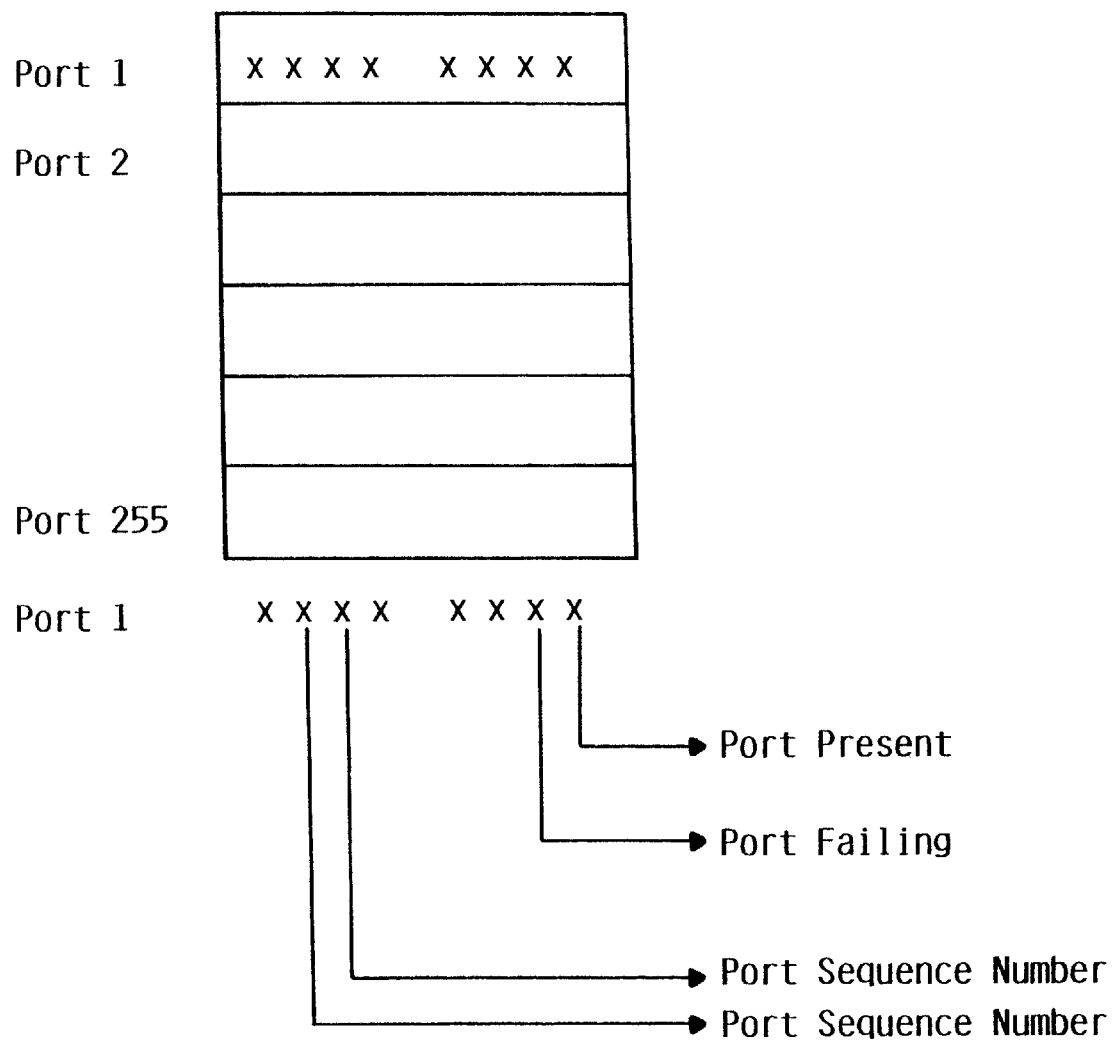
FIG. 5 illustrates a concentrator configuration table according to an exemplary embodiment of the invention.

When power is applied to the concentrator 116, the controller (microprocessor 110B) tests each multiplexer port, and also tri-states and reads each port to determine the presence or absence of a VPD chip 120. This presence and/or failure of each port is recorded in a configuration table stored and maintained in concentrator 116. An example of this table is illustrated in FIG. 5.

The configuration table is available to the operating system 102 and accessed using the SPCN ASC (Asset Control) command. Using the configuration table, the system software can save significant time by attempting communication only with ports which are actually occupied, i.e., connected to a VPD chip 120. In addition, a failure to communicate can be isolated to the failing occupied port. The savings are important because the accumulated time to detect and retry a no response time-out from each unoccupied port may significantly increase the time to successfully initialize (IPL) the system.

The concentrator 116 handles the unique smart card VPD protocol and maintains a unique sequence status for each port to the VPD chips 120, so that software is able to communicate with the VPD chips 120 in any order. A smart card VPD chip 120 communicates as one of a class of devices described by ISO 7816-3. Item "C" of FIG. 2, which corresponds to point "C" in FIG. 1, illustrates an exemplary block structure used by the protocol layer for communication with smart card VPD chips 120. The "nad" byte is available for addressing, but for purposes of describing this embodiment of the present invention, is not needed since each connection is point-to-point. The "pcb" byte is used for protocol control and includes sequence numbers and control bits for error detection and recovery. The length byte "L(i)" contains the length of the following data field. A check character field "LRC" ends the block. Only information in the data field, which includes the smart card command and data, are of interest to the operating system 102, i.e., the application layer. The address (nad), protocol control byte (pcb), length (L(i)), and check character (LRC) are for managing the communication at the lowest level, and therefore serve only to reliably transport the data field between the operating system 102 and a VPD chip 120.

A receiver of each block requires that sequence numbers received match what is expected. In order for the operating system 102 to successfully communicate with more than one device, the sequence number of the last message must be saved for use in sending and receiving the next message. Since different commands may be exchanged with different VPD chips 120, the sequence numbers of each port may be different. Therefore, to simplify communication with the operating system 102 and to improve performance, the protocol layer of communication and error recovery is managed by the concentrator 116. However, the illustrated system/protocol is presented for explanation purposes only, and one skilled in the art would understand that the invention is not necessarily limited to the particular details shown and described, but may be embodied in other ways.

Figure 3A:
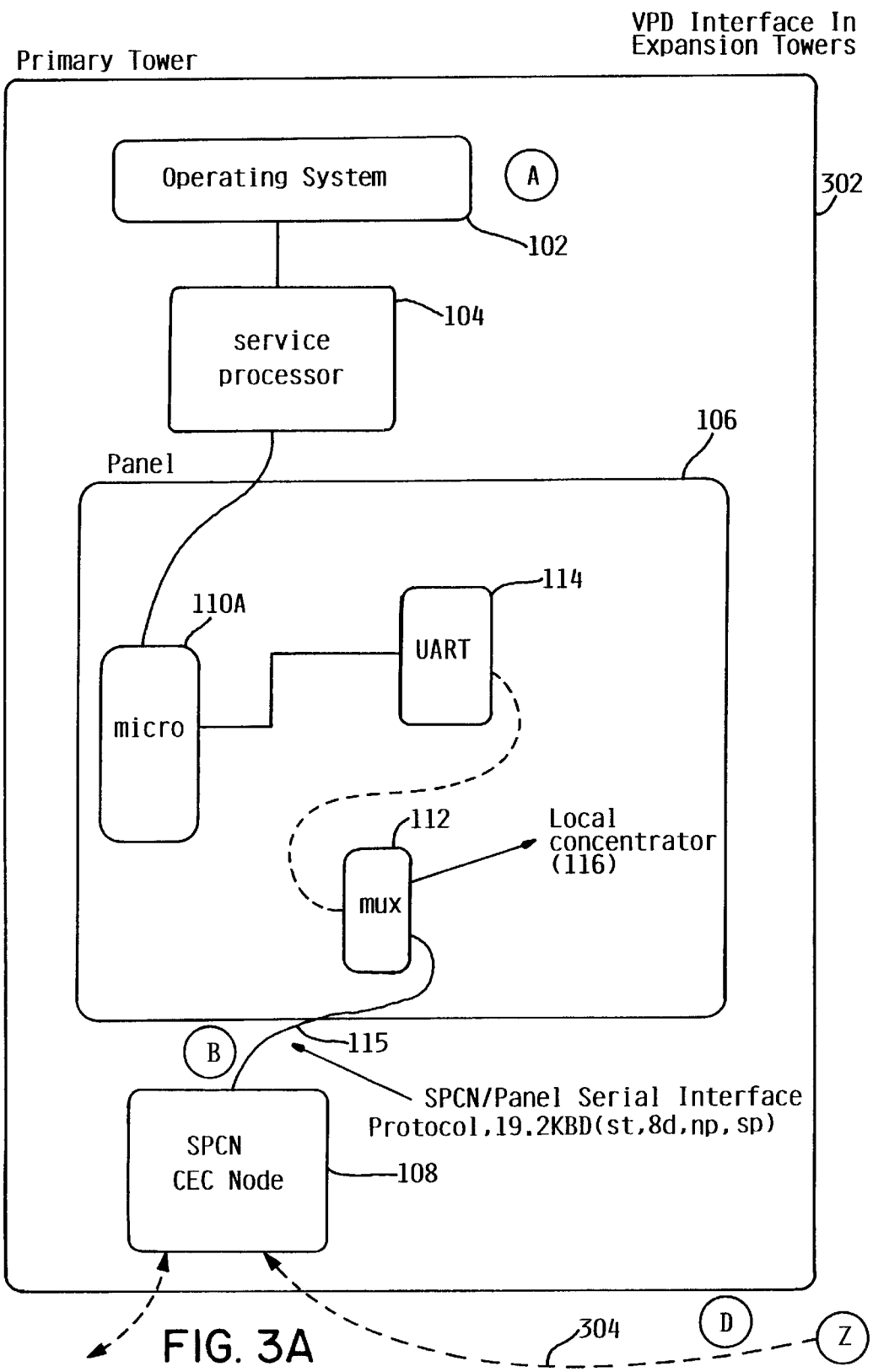
FIGS. 3A–3B illustrates a VPD chip hardware interface in an expansion tower of a computer system utilizing an embodiment of the present invention.
Figure 3B:
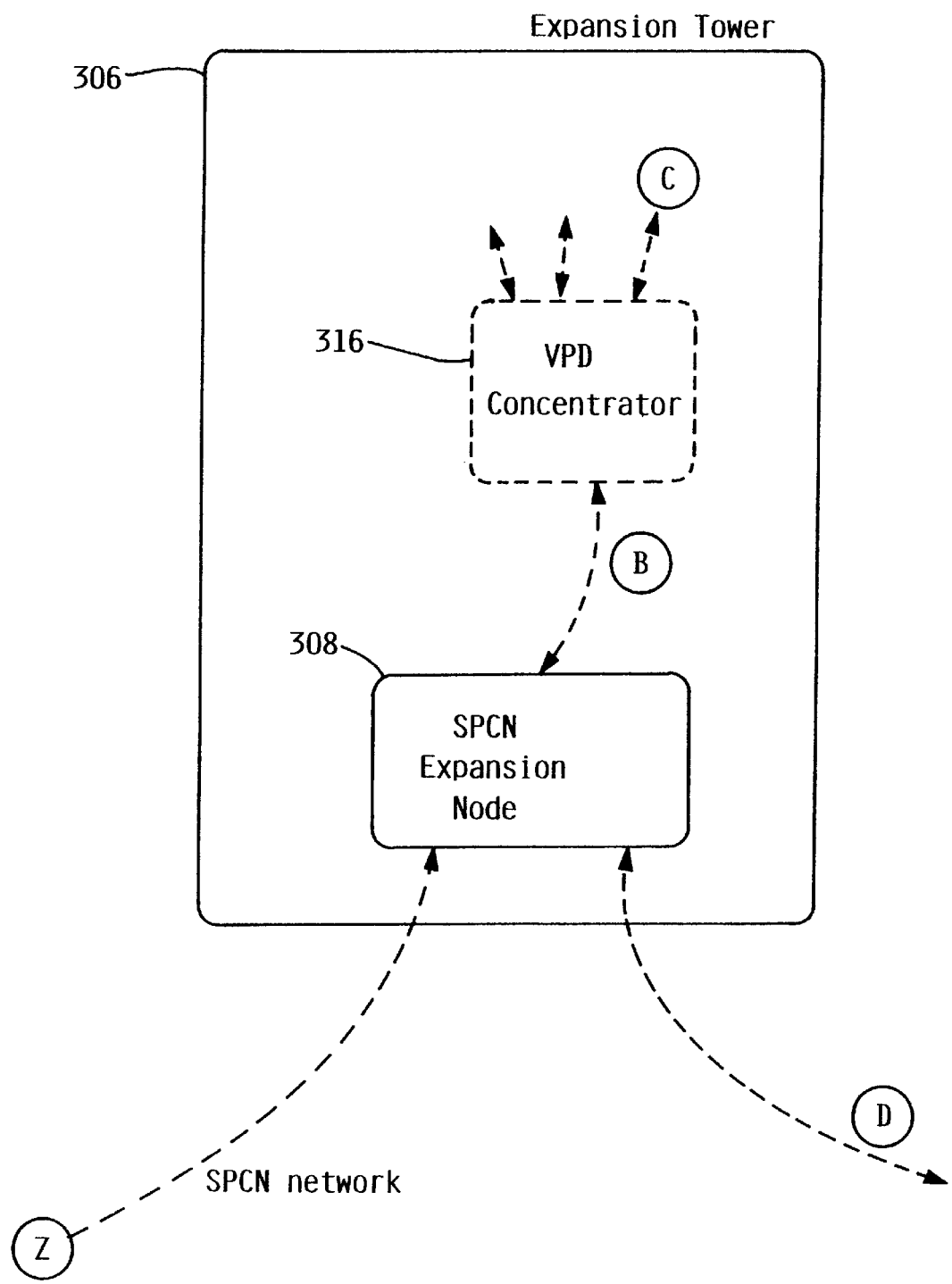

As mentioned at the outset, according to an aspect of the invention, the concentrator includes the function of encapsulating the special smart card Protocol within the SPCN network protocol, which provides a single system interface to a smart card VPD chip 120, located on a local concentrator 116 (as in FIG. 1), or on a remote concentrator 316 in an expansion tower (as in FIG. 3). The concentrator therefore operates to handle the protocol layer of smart card protocol and shields physical communication, message sequence management, and error recovery, for example, from the panel 106, the service processor 104, and the operating system 102.

Figure 2A:
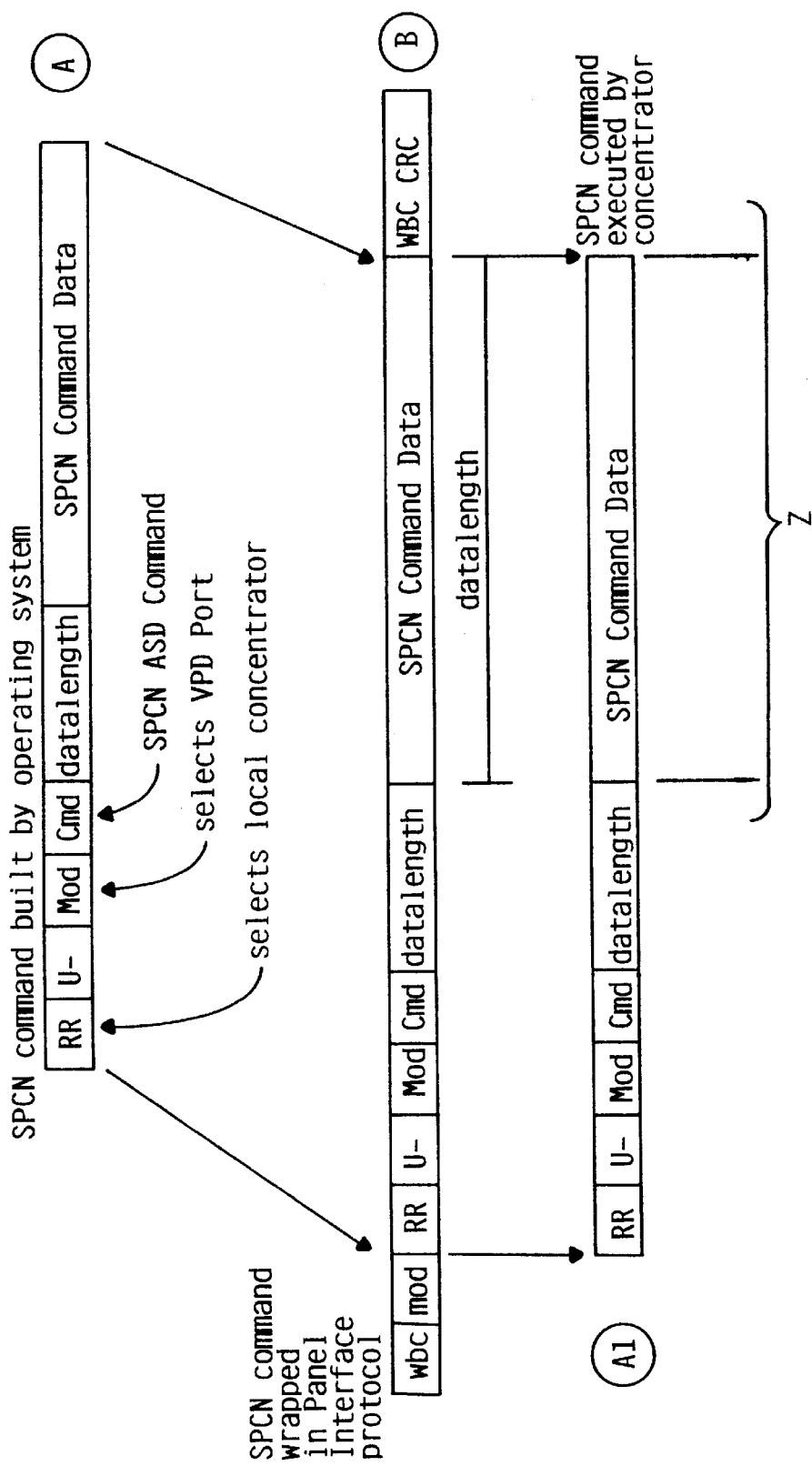
FIGS. 2A–2B illustrates protocol conversion in the processor (local) tower of FIG. 1, according to an embodiment of the invention.
Figure 2B:
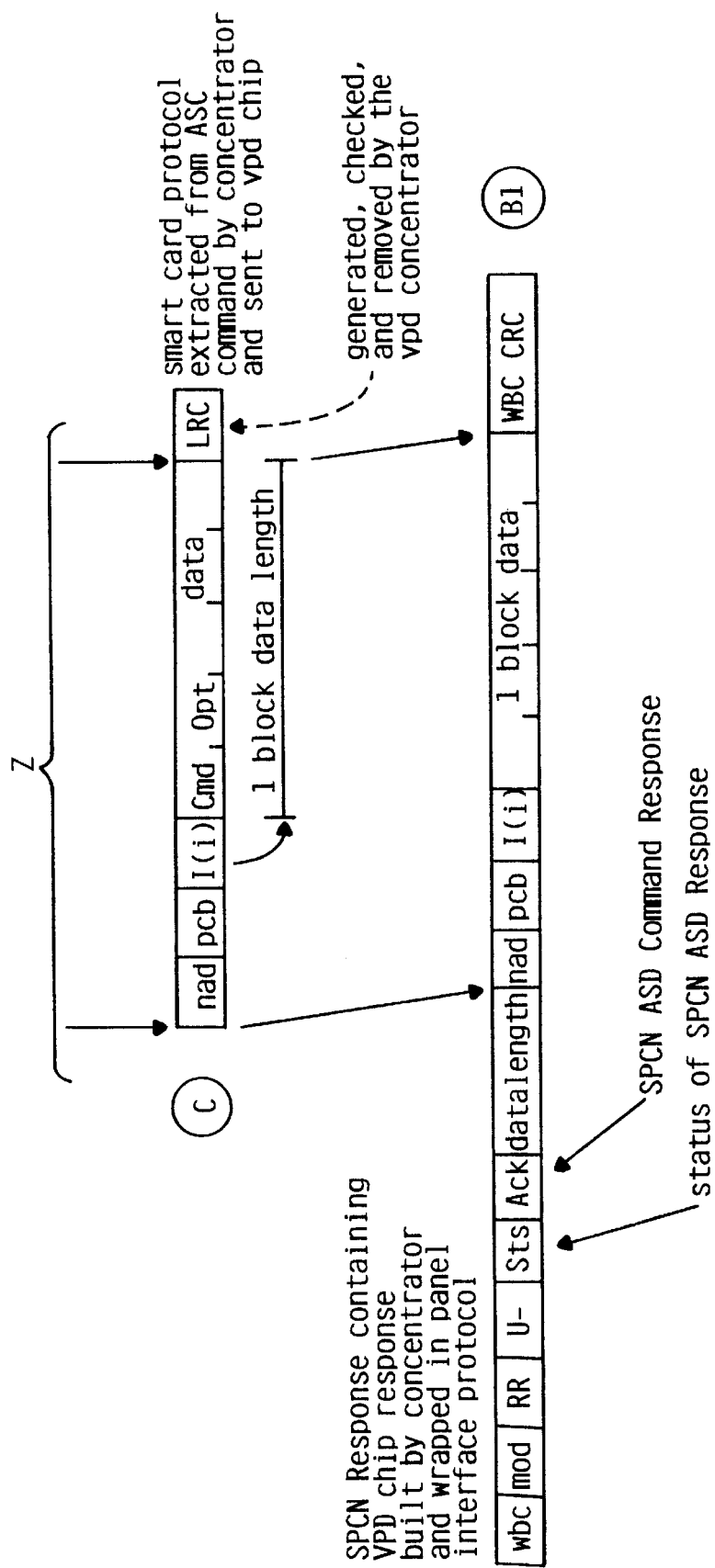

In FIG. 2, the protocol conversion used to communicate with the VPD chips 120 is represented. The operating system 102 communicates with the SPCN network using SPCN commands (not the subject of this disclosure) in a manner identical to communication with the concentrator 116. This process will now be described.

SPCN commands, which are built by the operating system 102 and addressed to one or more network nodes, are transported between the operating system 102 and the service processor 104 using the system I/O interface. The service processor 104 transfers the commands to the panel 106. The panel 106 encapsulates an SPCN command as the data field of a WBC panel interface command, and adds block check characters for detecting failures on the panel/SPCN interface. The WBC command is then transmitted to the SPCN CEC node 108. SPCN commands are not understood by any components in the path between the operating system 102 and the SPCN CEC node 108. The CEC node 108 examines the address and either executes it directly, or forwards it on the network. Responses are collected by the CEC node 108 and enclosed in a WBC command and block check characters, and transmitted to the panel 106 as the SPCN command response. The panel 106 recognizes the WBC command as containing data to be directed to the operating system 102. The panel 106 forwards the response to the service processor 104 which passes it to the operating system 102.

In this manner, the operating system 102 communicates with the local concentrator 116 using the SPCN ASC (Asset Control) command, and with the VPD chips 120 using the SPCN ASD (Asset Data) command. Smart card VPD commands are imbedded within the SPCN ASD command, and are not understood by any components in the path between the operating system 102 and the VPD chips 120. The ASC and ASD commands are transported between the operating system 102 and the service processor 104 using the system I/O interface. The service processor 104 transfers the command to the panel 106. The panel 106 encapsulates the SPCN command as the data field of a WBC panel interface command and adds block check characters. The WBC command is then transmitted to the concentrator 116. The concentrator 116 decodes the WBC command, which is the only panel interface command it recognizes, and executes the enclosed ASC or ASD command. If the enclosed command is an ASD command, the concentrator 116 selects the port specified in the command, and transmits the enclosed smart card command to the intended VPD chip 120.

The concentrator 116 then receives a response from the VPD chip 120, and the result is enclosed as data in an ASD command response. The ASD response thus constructed is enclosed within a WBC panel interface command and transmitted to the panel 106 where it is returned to the operating system 102 via the service processor 104.

The above process is illustrated in FIG. 2 in several exemplary stages, "A", "A1", "B", "B11" and "C" corresponding to like labeled points in FIG. 1. At "A" in the top of the figure, the operating system to asset concentrator command protocol (ASD—Asset Data Command) is shown. At "A1," the original ASD command is recovered by the concentrator 116. At "B," the panel to asset concentrator command protocol is shown. At "C", the asset concentrator to VPD chip protocol is shown. At the bottom of the figure, "B1," the response back to the panel 106 is shown. It consists of the response from the VPD chip 120 encapsulated in the ASD command response, which is in turn encapsulated in a WBC panel interface command.

As mentioned at the outset, application layer communication is between the operating system 102 and the VPD chips 120, and the concentrator 116, panel 106, and service processor 104 are not aware of those transactions. Each frame of multi-frame commands at the application layer is handled as a separate transaction in the concentrator protocol, thereby advantageously keeping the concentrator 116 inexpensive and simple enough to be implemented using read only storage (ROS) programming, for example.

The concentrator 116 provides addressability to each connected VPD chip 120, and maintains sequence status so that multi-frame commands may be initiated with one VPD chip 120 before a multi-frame command is completed with another.

Considering FIG. 2 in more detail at "A", the operating system 102 builds the application layer command to the smart card VPD chip 120 and places it in the data field of an SPCN ASD command. The modifier field of the ASD command selects the desired VPD chip 120. The RRU field of the ASD command selects the local concentrator 116, or a remote concentrator (described later with respect to the embodiment of FIG. 3). The command is forwarded to the panel 106 via the service processor 104 as described above. At "B", the panel 106 encapsulates the ASD command as data of a WBC panel interface command and adds block check characters (WBC CRC). The panel 106 determines whether the command is addressed to the local concentrator 116 and, prior to switching the multiplexer 112 away from the CEC node 108, the panel 106 notifies the CEC node 108 that the interface will be switched. This notification is so the CEC node 108 will not attempt to send messages to the panel 106 while the interface is switched to the local concentrator 116. Subsequently, the panel 106 transmits the command to the local concentrator 116.

As also mentioned at the outset, the smart card protocol is encapsulated within an SPCN network command ("A"), even if the concentrator 116 is directly connected in the CEC node 108. This shields all components in the path from the concentrator 116 to the operating system 102 from the details of the smart card protocol layer and presents a single SPCN command interface to the system for VPD chips 120 which are located in the CEC node 108, and ultimately for those located in expansion racks/towers of the SPCN network. The SPCN network command is in turn encapsulated in SPCN/panel interface protocol for communication between the panel 106 and the concentrator 116 ("B"). This minimizes the impact on the panel 106 to provide a part of the path from the operating system 102 to the concentrator 116.

The concentrator 116 validates the block check (WBC CRC) on the received command and decodes the WBC command, which is the only panel interface command it recognizes ("A1"). If the enclosed command is an ASD command, the concentrator 116 selects the port specified in the command modifier (mod) and transmits the enclosed smart card command after first adding the correct sequence numbers and block check character ("C"). The sequence numbers are calculated from the values saved in the configuration table for the selected port. The LRC block check is computed according to the smart card protocol and is not the same as the CRC block check used for the WBC panel interface command.

The concentrator 116 then waits for a response from the VPD chip 120. The sequence numbers and block check characters of the received response are validated and, if correct, the block check characters LRC are stripped from the smart card response and the result is enclosed as data in the ASD command response. If the response received from the VPD chip 120 is invalid, the concentrator 116 undertakes error recovery.

The concentrator 116 only returns a response to the panel 106 when the VPD response is valid, when retry fails, or when a time-out for receiving a response from the VPD chip 120 is exceeded. The received sequence numbers are saved by the concentrator 116 for use on the next communication with this problem port. The ASD response thus constructed is enclosed within a WBC panel interface command and block check characters WBC CRC, and transmitted to the panel 106 where it is returned to the operating system 102 via the service processor 104 ("B1").

The multiplexer 112 is thereafter switched back to the CEC node 108, and the CEC node 108 is notified that the interface is open to SPCN. The status field "sts" in the ASD response returned to the operating system 102 indicates whether the communications transport of the application layer command and response, i.e., the smart card command carried in the ASD command, was successful or not.

The write block control (WBC) protocol is thus used to transfer commands and responses between the panel 106 and the VPD local concentrator 116, and is transferred across the SPCN/panel interface as one block including the transport packaging and block check. As described, in this embodiment, a WBC block includes a smart card frame, an SPCN header, a WBC header, and a WBC CRC (cyclic redundancy check). The packet may range from 14 to 48 bytes, for example, depending on the size of the smart card frame. Each WBC command issued to the local concentrator 116 and the WBC command response returned from the local concentrator 116 represent a complete transaction from the operating system 102 to the local concentrator 116. However, one WBC command does not necessarily represent a complete command at the VPD chip application protocol level, but rather just one of potentially many frames that make up a complete command or response.

Therefore, with reference to the protocol at "A" of FIG. 2, the command modifier field (mod) may take a number of values representing different commands, such as reset VPD devices, read concentrator parameters, load concentrator parameters, and return the concentrator configuration table for selected ports. The "datalength" field specifies the number of bytes of additional data that accompany a command. The address field (RRU-) selects the destination of the SPCN command by the node address where the concentrator is located.

With reference to "B" in FIG. 2, the WBC modifier field (mod) provides routing information on the WBC command. The WBC cyclic redundancy check (CRC) field provides a error checking mechanism. In the response shown at the bottom of FIG. 2, the status (sts) field identifies success or failure of the WBC command, and, if a failure, the reason for the failure.

The operating system 102 may attempt error recovery of any concentrator failure by retrying the command, or by issuing a reset command to reinitialize all VPD chips. A reset will rebuild the concentrator configuration table and retest all concentrator ports. If a reset fails or commands to individual ports continue to fail, then the fault code retrieved from a read parameters command may be used to report the failure for repair. The concentrator configuration table (FIG. 5) indicates if a device (a VPD chip) is present at each respective port, and the status of communications with the device through the port, i.e., if there has been a failure condition.

As mentioned already, communication with the local concentrator 116 in the illustrated and described embodiment uses SPCN protocol, and the SPCN ASD command carries embedded smart card VPD chip protocol that the local concentrator 116 uses for protocol level communications with the VPD chips 120. This also permits the location of concentrators in remote towers/racks and communication over the SPCN network (as in FIG. 3). The SPCN ASC command is used to communicate with and control the local concentrator 116. The SPCN ASD command is used to communicate with individual VPD chips 120 connected to the concentrator 116/316.

FIG. 3 illustrates an application of the invention to computer system expansion towers in an SPCN network. In the system shown, the primary tower 302 includes the operating system 102, service processor 104, panel 106 and the SPCN CEC node 108. These need not be described in detail since they have been adequately discussed above with reference to corresponding devices in FIG. 1. Expansion tower 306 is coupled to the CEC node 108 through the SPCN network 304, and includes SPCN expansion node 308 and a VPD concentrator 316. Other expansion towers (not shown) of similar design may also be connected to the SPCN network.

Figure 4A:
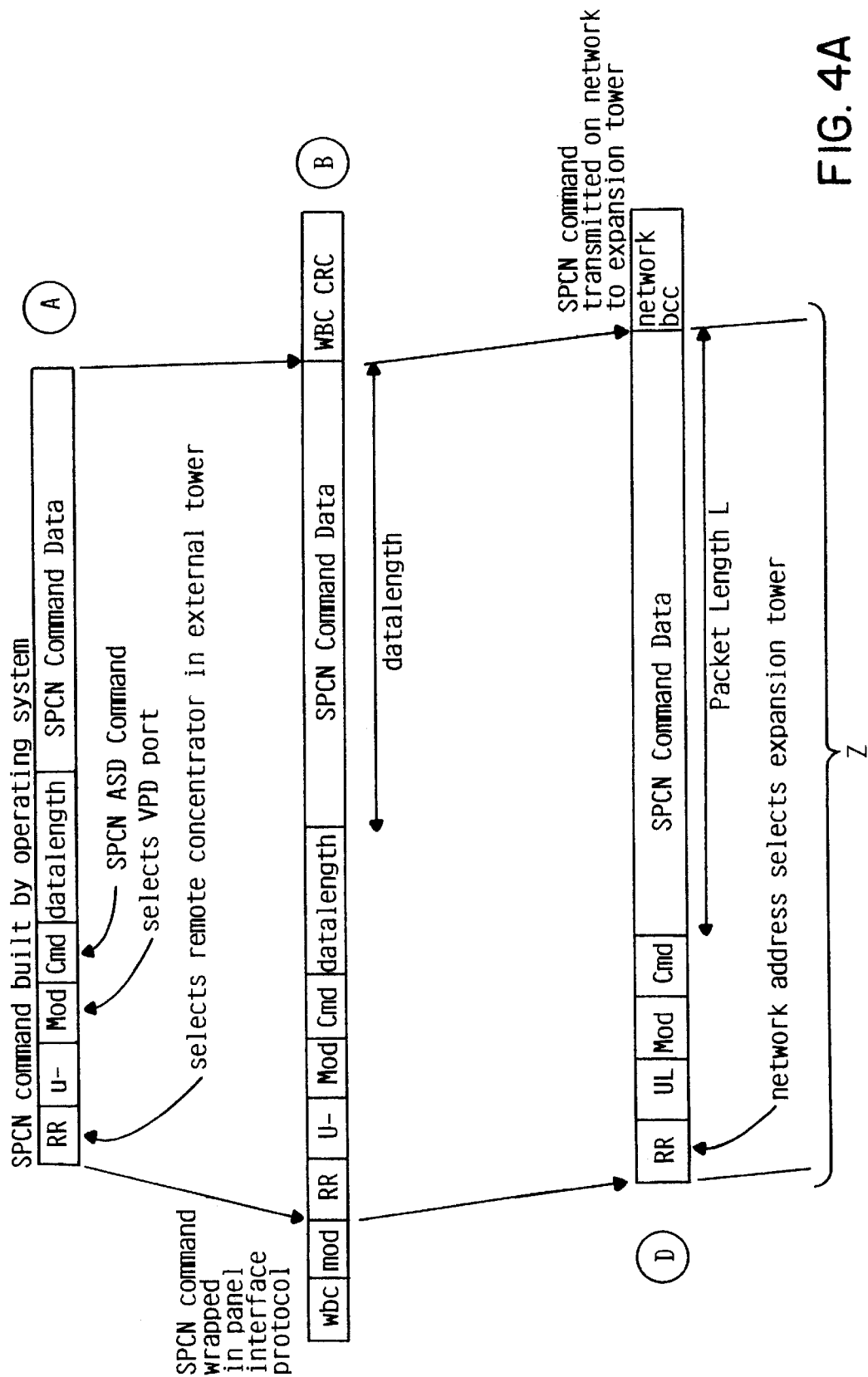
FIGS. 4A–4B illustrates an exemplary protocol conversion in an external tower such as illustrated in FIG. 3, according to an embodiment of the invention.
Figure 4B:
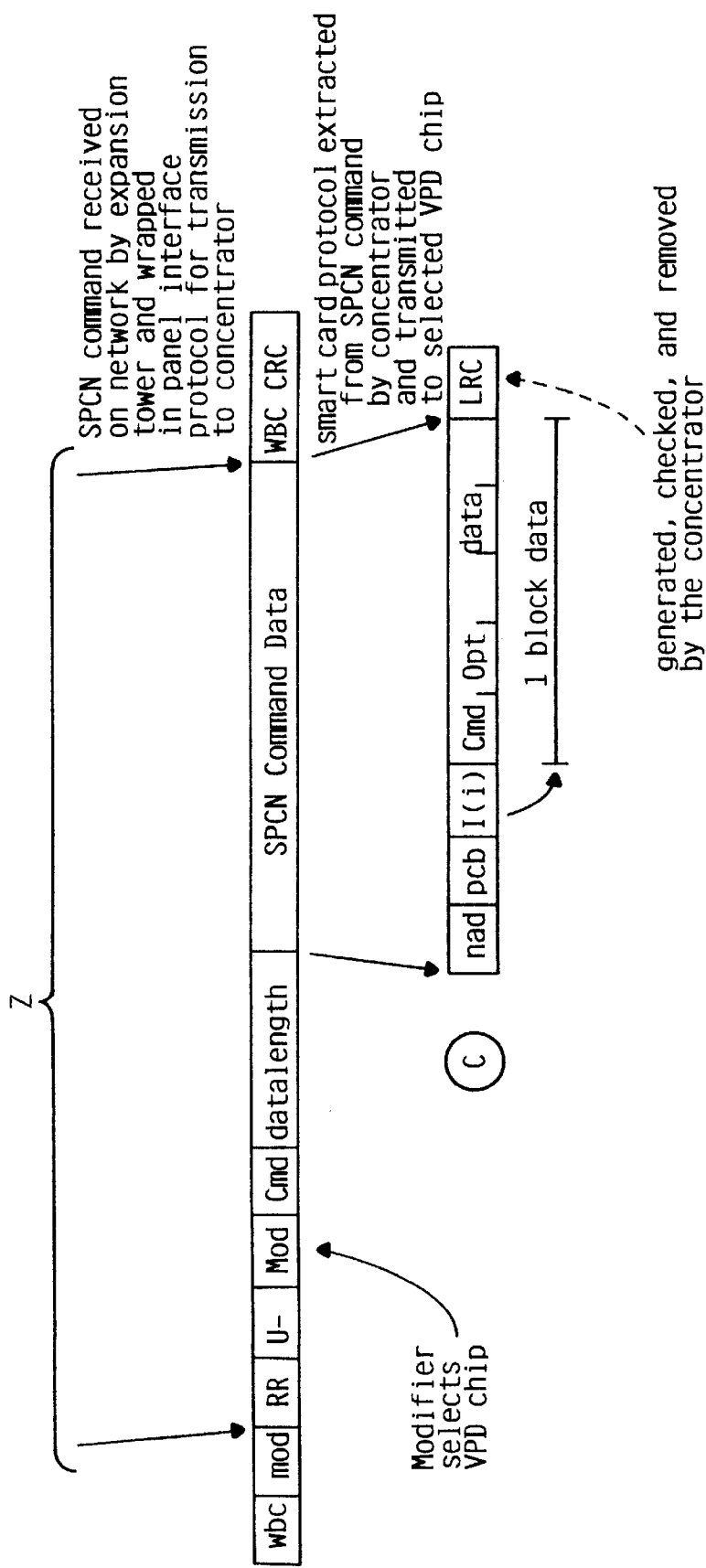

The protocol conversion for the system of FIG. 3 is illustrated in FIG. 4. The protocol stages of FIG. 4 are labeled "A," "B," "C," and "D" and correspond to the respective labeled points in the communications path of FIG. 3. The difference to note, as compared to the conversion shown in FIG. 2, is the conversion at "D" representing the protocol conversion used in transferring the SPCN ASC and ASD commands from the CEC node 108 to the SPCN expansion node 308 in this embodiment.

When the panel 106 receives the SPCN ASC/ASD command from the service processor 104, the address is examined and if not addressed to the local concentrator (116), the command is encapsulated as data in the WBC and transmitted to the CEC SPCN node 108 ("B"). The CEC node 108 treats the command as any other SPCN command, i.e., it removes the WBC framing and block check characters, and transmits the command on the SPCN internode network ("D"). The command is received by the addressed node 308 in the respective expansion tower 306, where the command is decoded and determined to be an ASC or ASD command. The received command is encapsulated as data in a WBC command and transmitted to the concentrator 316 attached to the expansion tower node 308 ("B"). The smart card VPD command is extracted from the ASD command and transmitted to the selected VPD chip 120, as already described ("C").

Alternately, if only a few VPD chip devices 120 exist in the expansion node 308, the "concentrator" function may be integrated in the expansion tower SPCN node 308, and the VPD chips 120 directly connected to the expansion node microprocessor itself via a multiplexer (not shown). In other words, a separate concentrator device may not be required in such a situation.

Therefore, with reference to the exemplary smart card protocol extracted by the concentrator 116/316 and illustrated in FIGS. 2 and 4 at "C", the "nad" field includes a destination address and an originator address, the "pcb" field contains a block indicator, protocol sequence indicators and a chain flag, as well as bits used only by the concentrator 116/316, the "L" field indicates the I block data length, and the "Cmd" field, and those immediately following, contain the smart card VPD command/response.

An exemplary concentrator configuration table described above is illustrated in FIG. 5. This table gives an indication of whether a VPD chip 120 is present at the respective port, and whether it is operating. Port sequence numbers are also kept in the exemplary table, as shown.

It should be understood, however, that the invention is not necessarily limited to the specific protocols and transformations shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. An apparatus for operatively coupling a plurality of information circuits to a computer system control device, comprising:
   at least one multiplexer which sends and receives first signals with the plurality of information circuits over a plurality of respective point-to-point lines; and
   a controller which controls the at least one multiplexer and communicates with the computer system control device using second signals;
   wherein the first signals use a first protocol, and the second signals use a second protocol different from the first protocol; and
   wherein the controller converts between the first and second protocols to enable communications between the plurality of information circuits and the computer system control device.

2. The apparatus according to claim 1, wherein each one of the plurality of information circuits comprises a smart card circuit storing vital product data about a respective device associated with the respective smart card circuit.

3. A control system having the apparatus according to claim 2, wherein the apparatus is coupled to the computer system control device through the at least one second multiplexer.

4. A control system having the apparatus according to claim 2, wherein the apparatus is coupled to the computer system control device through a systems control network.

5. A computer system configuration control system, having the apparatus according to claim 1, wherein the computer system control device comprises:
   a control panel which communicates with the apparatus controller;
   a service processor which communicates with the control panel; and
   an operating system which communicates with the service processor;
   whereby the operating system communicates with the plurality of information circuits through the service processor, the control panel and the apparatus controller.

6. The computer system configuration control system according to claim 5, wherein each one of the plurality of information circuits comprises a smart card circuit storing vital product data about a respective device associated with the respective smart card circuit.

7. The computer system configuration control system according to claim 6, wherein the plurality of information circuits include information circuits associated with at least one of:
   memory device;
   a processor;
   a backplane'
   a direct access storage device; and
   an input/output device.

8. The computer system configuration control system according to claim 6, wherein the plurality of information circuits contain configuration information including at least one of:
   power requirements;
   voltage level requirements; and
   cooling requirements.

9. The computer system configuration control system according to claim 8, wherein the plurality of information circuits are coupled to the at least one multiplexer using tri-stating circuitry;
   whereby the presence or absence of an information circuit can be readily detected.

10. A method of concentrating signals from a plurality of information circuits and converting protocol to enable communication between the information circuits and a computer system control device comprising utilizing the apparatus according to claim 1.

11. In a computer system control system, a method of communication between a computer system control device and a plurality of information circuits containing vital product data, the method comprising:
   point-to-point coupling the plurality of information circuits to a concentrator;
   coupling the concentrator to the computer system control device; and performing protocol conversion between a protocol used to communicate with the information circuits and a different protocol used to communicate with the computer system control device when transferring vital product data from the Plurality of information circuits.

12. The method according to claim 11, wherein the protocol conversion comprises:
converting between a smart card protocol used by the information circuits and a transport protocol used by the computer system control device.

13. The method according to claim 11, where the protocol conversion further comprises using operating system commands and response messages to carry commands and responses to and from the information circuits and the computer system control device.

14. The method according to claim 11, wherein the coupling of the concentrator to the computer system control device comprises coupling through at least one multiplexer.

15. The method according to claim 11, wherein the coupling of the concentrator to the computer system control device comprises coupling through a system control network using a network protocol.

16. The method according to claim 11, wherein the point-to-point coupling of the plurality of information circuits to a concentrator comprises coupling using at least one multiplexer.

17. The method according to claim 11, further comprising maintaining a table with an entry for each information circuit, wherein the table includes sequence information.

18. The method according to claim 11, wherein the computer system control device is further coupled to a network, and wherein the method further comprises switching in the computer system control device between communication with the concentrator and communication with the network.

19. The method according to claim 11, wherein the point-to-point coupling comprises coupling using tri-stating circuitry; and
wherein the method further comprises:
detecting the presence or absence of an information circuit by detecting a tri-state logic level on an associated point-to-point circuit.

20. In a computer system control system, a method of communication between a computer system control device and a plurality of information circuits containing vital product data, the method comprising:
point-to-point coupling the plurality of information circuits to a concentrator;
coupling the concentrator to the computer system control device; and
performing protocol conversion between a protocol used to communicate with the information circuits and a different protocol used to communicate with the computer system control device;
wherein the protocol conversion comprises:
converting between a first protocol used between an operating system and the computer system control device, and a second protocol used between the computer system control device and the concentrator; and
converting between the second protocol used between the computer system control device and the concentrator, and a third protocol used between the concentrator and the information circuits.

* * * * *